United States Patent
Shimomura

(10) Patent No.: US 12,058,730 B2
(45) Date of Patent: Aug. 6, 2024

(54) BASE STATION APPARATUS, TERMINAL APPARATUS, AND COMMUNICATION SYSTEM

(71) Applicant: FUJITSU LIMITED, Kawasaki (JP)

(72) Inventor: Tsuyoshi Shimomura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 329 days.

(21) Appl. No.: 17/342,834

(22) Filed: Jun. 9, 2021

(65) Prior Publication Data

US 2021/0298071 A1    Sep. 23, 2021

Related U.S. Application Data

(63) Continuation of application No. PCT/JP2018/048184, filed on Dec. 27, 2018.

(51) Int. Cl.
*H04W 72/21* (2023.01)
*H04W 72/1268* (2023.01)
*H04W 74/04* (2009.01)

(52) U.S. Cl.
CPC ....... *H04W 74/04* (2013.01); *H04W 72/1268* (2013.01); *H04W 72/21* (2023.01)

(58) Field of Classification Search
CPC .............................. H04W 74/04; H04W 72/21
See application file for complete search history.

(56) References Cited

U.S. PATENT DOCUMENTS

| | | | |
|---|---|---|---|
| 2009/0290570 | A1 | 11/2009 | Kishiyama et al. |
| 2012/0213193 | A1* | 8/2012 | Kwon ................... H04L 5/0007 370/330 |
| 2017/0019930 | A1 | 1/2017 | Lee et al. |
| 2018/0199343 | A1* | 7/2018 | Deogun ............... H04L 5/0044 |
| 2019/0349233 | A1* | 11/2019 | Dinan ................... H04W 72/23 |
| 2019/0380139 | A1 | 12/2019 | Xiong et al. |
| 2021/0227566 | A1* | 7/2021 | Shih ................. H04W 74/0833 |

FOREIGN PATENT DOCUMENTS

| | | |
|---|---|---|
| CN | 101502161 A | 8/2009 |
| CN | 106105366 A | 11/2016 |
| CN | 108289337 A | 7/2018 |
| WO | 2007/148586 A1 | 12/2007 |

OTHER PUBLICATIONS

First Notification of Office Action and Search Report issued by the China National Intellectual Property Administration for corresponding Chinese Patent Application No. 201880100425.6, dated Apr. 20, 2023, with an English translation.

(Continued)

*Primary Examiner* — Michael T Vu
(74) *Attorney, Agent, or Firm* — Myers Wolin, LLC

(57) ABSTRACT

A base station apparatus that executes a random-access procedure, the base station apparatus includes, a notifier that notifies a terminal apparatus of a transmission permission of a scheduling request by a shared wireless resource, which is part or all of wireless resources used for the random-access procedure; and a receiver that receives a scheduling request transmitted from the terminal apparatus by the shared wireless resource.

15 Claims, 12 Drawing Sheets

COMMUNICATION SYSTEM 10

TERMINAL APPARATUS               BASE STATION APPARATUS

(56) References Cited

OTHER PUBLICATIONS

3GPP TS 36.133 V15.3.0, "3rd Generation Partnership Project; Technical Specification Group Radio Access Network; Evolved Universal Terrestrial Radio Access (E-UTRA); Requirements for support of radio resource management (Release 15)", Jun. 2018.
3GPP TS 36.211 V15.2.0, "3rd Generation Partnership Project; Technical Specification Group Radio Access Network; Evolved Universal Terrestrial Radio Access (E-UTRA); Physical channels and modulation (Release 15)", Jun. 2018.
3GPP TS 36.212 V15.2.1, "3rd Generation Partnership Project; Technical Specification Group Radio Access Network; Evolved Universal Terrestrial Radio Access (E-UTRA); Multiplexing and channel coding (Release 15)", Jul. 2018.
3GPP TS 36.213 V15.2.0, "3rd Generation Partnership Project; Technical Specification Group Radio Access Network; Evolved Universal Terrestrial Radio Access (E-UTRA); Physical layer procedures (Release 15)", Jun. 2018.
3GPP TS 36.300 V15.2.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", Jun. 2018.
3GPP TS 36.321 V15.2.0, "3rd Generation Partnership Project; Technical Specification Group Radio Access Network; Evolved Universal Terrestrial Radio Access (E-UTRA); Medium Access Control (MAC) protocol specification (Release 15)", Jul. 2018.
3GPP TS 36.322 V15.1.0, "3rd Generation Partnership Project; Technical Specification Group Radio Access Network; Evolved Universal Terrestrial Radio Access (E-UTRA); Radio Link Control (RLC) protocol specification (Release 15)", Jul. 2018.
3GPP TS 36.323 V15.0.0, "3rd Generation Partnership Project; Technical Specification Group Radio Access Network; Evolved Universal Terrestrial Radio Access (E-UTRA); Packet Data Convergence Protocol (PDCP) specification (Release 15)", Jul. 2018.
3GPP TS 36.331 V15.2.2, "3rd Generation Partnership Project; Technical Specification Group Radio Access Network; Evolved Universal Terrestrial Radio Access (E-UTRA); Radio Resource Control (RRC); Protocol specification (Release 15)", Jun. 2018.
3GPP TS 36.413 V15.2.0, "3rd Generation Partnership Project; Technical Specification Group Radio Access Network; Evolved Universal Terrestrial Radio Access Network (E-UTRAN); S1 Application Protocol (S1AP) (Release 15)", Jun. 2018.
3GPP TS 36.423 V15.2.0, "3rd Generation Partnership Project; Technical Specification Group Radio Access Network; Evolved Universal Terrestrial Radio Access Network (E-UTRAN); X2 application protocol (X2AP) (Release 15)", Jun. 2018.
3GPP TS 36.425 V15.0.0, "3rd Generation Partnership Project; Technical Specification Group Radio Access Network; Evolved Universal Terrestrial Radio Access Network (E-UTRAN); X2 interface user plane protocol (Release 15)", Jun. 2018.
3GPP TS 37.340 V15.2.0, "3rd Generation Partnership Project; Technical Specification Group Radio Access Network; Evolved Universal Terrestrial Radio Access (E-UTRA) and NR; Multi-connectivity; Stage 2 (Release 15)", Jun. 2018.
3GPP TS 38.201 V15.0.0, "3rd Generation Partnership Project; Technical Specification Group Radio Access Network; NR; Physical layer; General description (Release 15)", Dec. 2017.
3GPP TS 38.202 V15.2.0, "3rd Generation Partnership Project; Technical Specification Group Radio Access Network; NR; Services provided by the physical layer (Release 15)", Jun. 2018.
3GPP TS 38.211 V15.2.0, "3rd Generation Partnership Project; Technical Specification Group Radio Access Network; NR; Physical channels and modulation (Release 15)", Jun. 2018.
3GPP TS 38.212 V15.2.0, "3rd Generation Partnership Project; Technical Specification Group Radio Access Network; NR; Multiplexing and channel coding (Release 15)", Jun. 2018.

3GPP TS 38.213 V15.2.0, "3rd Generation Partnership Project; Technical Specification Group Radio Access Network; NR; Physical layer procedures for control (Release 15)", Jun. 2018.
3GPP TS 38.214 V15.2.0, "3rd Generation Partnership Project; Technical Specification Group Radio Access Network; NR; Physical layer procedures for data (Release 15)", Jun. 2018.
3GPP TS 38.215 V15.2.0, "3rd Generation Partnership Project; Technical Specification Group Radio Access Network; NR; Physical layer measurements (Release 15)", Jun. 2018.
3GPP TS 38.300 V15.2.0, "3rd Generation Partnership Project; Technical Specification Group Radio Access Network; NR; NR and NG-RAN Overall Description; Stage 2 (Release 15)", Jun. 2018.
3GPP TS 38.321 V15.2.0, "3rd Generation Partnership Project; Technical Specification Group Radio Access Network; NR; Medium Access Control (MAC) protocol specification (Release 15)", Jun. 2018.
3GPP TS 38.322 V15.2.0, "3rd Generation Partnership Project; Technical Specification Group Radio Access Network; NR; Radio Link Control (RLC) protocol specification (Release 15)", Jun. 2018.
3GPP TS 38.323 V15.2.0, "3rd Generation Partnership Project; Technical Specification Group Radio Access Network; NR; Packet Data Convergence Protocol (PDCP) specification (Release 15)", Jun. 2018.
3GPP TS 38.331 V15.2.1, "3rd Generation Partnership Project; Technical Specification Group Radio Access Network; NR; Radio Resource Control (RRC) protocol specification (Release 15)", Jun. 2018.
3GPP TS 38.401 V15.2.0, "3rd Generation Partnership Project; Technical Specification Group Radio Access Network; NG-RAN; Architecture description (Release 15)", Jun. 2018.
3GPP TS 38.410 V15.0.0, "3rd Generation Partnership Project; Technical Specification Group Radio Access Network; NG-RAN; NG general aspects and principles (Release 15)", Jun. 2018.
3GPP TS 38.413 V15.0.0, "3rd Generation Partnership Project; Technical Specification Group Radio Access Network; NG-RAN; NG Application Protocol (NGAP) (Release 15)", Jun. 2018.
3GPP TS 38.420 V15.0.0, "3rd Generation Partnership Project; Technical Specification Group Radio Access Network; NG-RAN; Xn general aspects and principles (Release 15)", Jun. 2018.
3GPP TS 38.423 V15.0.0, "3rd Generation Partnership Project; Technical Specification Group Radio Access Network; NG-RAN; Xn application protocol (XnAP) (Release 15)", Jun. 2018.
3GPP TS 38.470 V15.2.0, "3rd Generation Partnership Project; Technical Specification Group Radio Access Network; NG-RAN; F1 general aspects and principles (Release 15)", Jun. 2018.
3GPP TS 38.473 V15.2.1, "3rd Generation Partnership Project; Technical Specification Group Radio Access Network; NG-RAN; F1 application protocol (F1AP) (Release 15)", Jul. 2018.
3GPP TR 38.801 V14.0.0, "3rd Generation Partnership Project; Technical Specification Group Radio Access Network; Study on new radio access technology: Radio access architecture and interfaces (Release 14)", Mar. 2017.
3GPP TR 38.802 V14.2.0, "3rd Generation Partnership Project; Technical Specification Group Radio Access Network; Study on New Radio Access Technology Physical Layer Aspects (Release 14)", Sep. 2017.
3GPP TR 38.803 V14.2.0, "3rd Generation Partnership Project; Technical Specification Group Radio Access Network; Study on new radio access technology: Radio Frequency (RF) and co-existence aspects (Release 14)", Sep. 2017.
3GPP TR 38.804 V14.0.0, "3rd Generation Partnership Project; Technical Specification Group Radio Access Network; Study on New Radio Access Technology; Radio Interface Protocol Aspects (Release 14)", Mar. 2017.
3GPP TR 38.900 V15.0.0, "3rd Generation Partnership Project; Technical Specification Group Radio Access Network; Study on channel model for frequency spectrum above 6 GHZ (Release 15)", Jun. 2018.
3GPP TR 38.912 V15.0.0, "3rd Generation Partnership Project; Technical Specification Group Radio Access Network; Study on New Radio (NR) access technology (Release 15)", Jun. 2018.

(56) References Cited

OTHER PUBLICATIONS

3GPP TR 38.913 V15.0.0, "3rd Generation Partnership Project; Technical Specification Group Radio Access Network; Study on Scenarios and Requirements for Next Generation Access Technologies; (Release 15)", Jun. 2018.

3GPP TS 37.213 V15.0.0, "3rd Generation Partnership Project; Technical Specification Group Radio Access Network; Physical layer procedures for shared spectrum channel access (Release 15)", Jun. 2018.

ZTE, "Remaining issues for scheduling request", Agenda Item: 6.1.5.1.3, 3GPP TSG-RAN WG1 Meeting #94, R1-1808626, Gothenburg, Sweden, Aug. 20-24, 2018.

International Search Report issued by the Japan Patent Office for corresponding International Patent Application No. PCT/JP2018/048184, mailed on Feb. 2, 2019, with an English translation.

Written Opinion of the International Searching Authority issued by the Japan Patent Office for corresponding International Patent Application No. PCT/JP2018/048184, mailed on Feb. 2, 2019, with an English translation.

Intel Corporation, "Design of scheduling request for feNB-IoT", Agenda Item: 6.2.7.1.2, 3GPP TSG-RAN WG1 Meeting #89, R1-1707320, Hangzhou, P. R. China, May 15-19, 2017.

Ericsson, "Physical layer scheduling request for NB-IoT", Agenda Item: 6.2.6.4, 3GPP TSG-RAN WG1 Meeting #90bis, R1-1717012, Prague, Czech Republic, Oct. 9-13, 2017.

Huawei et al., "Feature lead summary of physical layer SR in feNB-IoT", Agenda Item: 6.2.7.1.3, 3GPP TSG-RAN WG1 Meeting #93, R1-1807512, Busan, Korea, May 21-25, 2018.

ZTE et al., "Summary of off-line discussion of AI 6.1.4.1, Remaining details on PRACH formats", Agenda Item: 6.1.4.1, 3GPP TSG-RAN WG1 Meeting NR #3, R1-1716762, Nagoya, Japan, Sep. 18-21, 2017.

LG Electronics, "PUSCH related techniques for LTE URLLC", Agenda Item: 6.2.7.2.4, 3GPP TSG-RAN WG1 Meeting #92, R1-1802183, Athens, Greece, Feb. 26-Mar. 2, 2018.

Notice of Reasons for Refusal issued by the Japan Patent Office for corresponding Japanese Patent Application No. 2020-562057, dated May 17, 2022, with full English machine translation.

Second Notification of Office Action and Search Report issued by the China National Intellectual Property Administration for corresponding Chinese Patent Application No. 201880100425.6, dated Aug. 30, 2023, with an English translation.

\* cited by examiner

COMMUNICATION SYSTEM 10

TERMINAL APPARATUS     BASE STATION APPARATUS

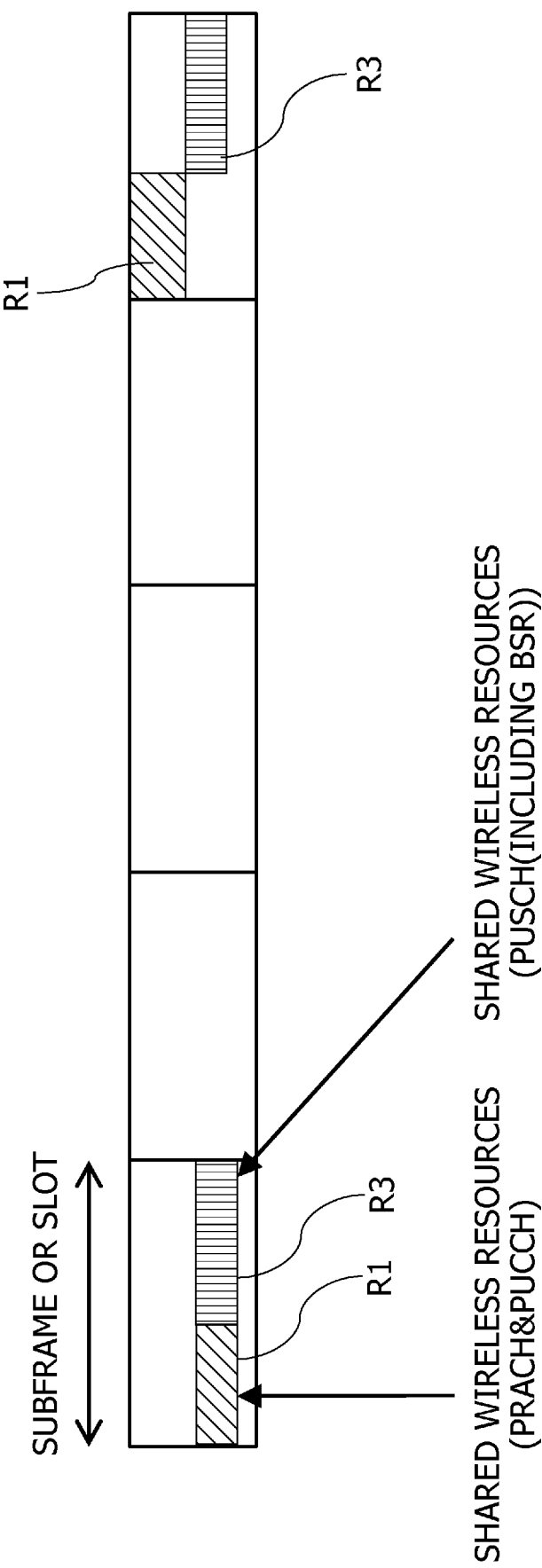

BASE STATION APPARATUS, TERMINAL APPARATUS, AND COMMUNICATION SYSTEM

CROSS-REFERENCE TO RELATED APPLICATION

This application is a continuation application of International Application Number PCT/JP2018/048184 filed on Dec. 27, 2018 and designated the U.S., the entire contents of which are incorporated herein by reference.

FIELD

The present invention relates to a base station apparatus, a terminal apparatus, and a communication system.

BACKGROUND

In modern communication networks, mobile terminal (e.g., smartphone and future phone) traffic takes up the greater part of resources of the communication networks. Traffic used by mobile terminals is in a trend of expanding hereafter as well.

Meanwhile, there is demand for the communication networks to cope with services having various requirement conditions, as IoT (Internet of things) services (e.g., traffic systems, smart meters, monitoring systems of apparatuses, and so forth) are being implemented. Accordingly, technology for realizing even higher data signal rates, larger capacity, and lower latency is demanded in the 5th generation mobile communication systems (5G, or NR (New Radio)) communication standard, in addition to the standard technology of 4th generation mobile communication systems (4G) (e.g., Non-Patent Literature 1 to 12). Note that technological studies regarding the 5th generation communication standard are being carried out in 3GPP workgroups (e.g., TSG-RAN WG1, TSG-RAN WG2, etc.), and an initial version was released in December of 2017 (Non-Patent Literature 13 to 39).

5G anticipates supporting many usage cases, classified into eMBB (Enhanced Mobile BroadBand), Massive MTC (Machine Type Communications), and URLLC (Ultra-Reliable and Low Latency Communication), to cope with a wide variety of services as described above.

Technology relating to 5G is described in the following prior art documents.

CITATION LIST

Non-Patent Literature

NON PATENT LITERATURE 1: 3GPP TS 36.133 V15.3.0 (2018-06)
NON PATENT LITERATURE 2: 3GPP TS 36.211 V15.2.0 (2018-06)
NON PATENT LITERATURE 3: 3GPP TS 36.212 V15.2.1 (2018-07)
NON PATENT LITERATURE 4: 3GPP TS 36.213 V15.2.0 (2018-06)
NON PATENT LITERATURE 5: 3GPP TS 36.300 V15.2.0 (2018-06)
NON PATENT LITERATURE 6: 3GPP TS 36.321 V15.2.0 (2018-07)
NON PATENT LITERATURE 7: 3GPP TS 36.322 V15.1.0 (2018-07)
NON PATENT LITERATURE 8: 3GPP TS 36.323 V15.0.0 (2018-07)
NON PATENT LITERATURE 9: 3GPP TS 36.331 V15.2.2 (2018-06)
NON PATENT LITERATURE 10: 3GPP TS 36.413 V15.2.0 (2018-06)
NON PATENT LITERATURE 11: 3GPP TS 36.423 V15.2.0 (2018-06)
NON PATENT LITERATURE 12: 3GPP TS 36.425 V15.0.0 (2018-06)
NON PATENT LITERATURE 13: 3GPP TS 37.340 V15.2.0 (2018-06)
NON PATENT LITERATURE 14: 3GPP TS 38.201 V15.0.0 (2017-12)
NON PATENT LITERATURE 15: 3GPP TS 38.202 V15.2.0 (2018-06)
NON PATENT LITERATURE 16: 3GPP TS 38.211 V15.2.0 (2018-06)
NON PATENT LITERATURE 17: 3GPP TS 38.212 V15.2.0 (2018-06)
NON PATENT LITERATURE 18: 3GPP TS 38.213 V15.2.0 (2018-06)
NON PATENT LITERATURE 19: 3GPP TS 38.214 V15.2.0 (2018-06)
NON PATENT LITERATURE 20: 3GPP TS 38.215 V15.2.0 (2018-06)
NON PATENT LITERATURE 21: 3GPP TS 38.300 V15.2.0 (2018-06)
NON PATENT LITERATURE 22: 3GPP TS 38.321 V15.2.0 (2018-06)
NON PATENT LITERATURE 23: 3GPP TS 38.322 V15.2.0 (2018-06)
NON PATENT LITERATURE 24: 3GPP TS 38.323 V15.2.0 (2018-06)
NON PATENT LITERATURE 25: 3GPP TS 38.331 V15.2.1 (2018-06)
NON PATENT LITERATURE 26: 3GPP TS 38.401 V15.2.0 (2018-06)
NON PATENT LITERATURE 27: 3GPP TS 38.410 V15.0.0 (2018-06)
NON PATENT LITERATURE 28: 3GPP TS 38.413 V15.0.0 (2018-06)
NON PATENT LITERATURE 29: 3GPP TS 38.420 V15.0.0 (2018-06)
NON PATENT LITERATURE 30: 3GPP TS 38.423 V15.0.0 (2018-06)
NON PATENT LITERATURE 31: 3GPP TS 38.470 V15.2.0 (2018-06)
NON PATENT LITERATURE 32: 3GPP TS 38.473 V15.2.1 (2018-07)
NON PATENT LITERATURE 33: 3GPP TR 38.801 V14.0.0 (2017-03)
NON PATENT LITERATURE 34: 3GPP TR 38.802 V14.2.0 (2017-09)
NON PATENT LITERATURE 35: 3GPP TR 38.803 V14.2.0 (2017-09)
NON PATENT LITERATURE 36: 3GPP TR 38.804 V14.0.0 (2017-03)
NON PATENT LITERATURE 37: 3GPP TR 38.900 V15.0.0 (2018-06)
NON PATENT LITERATURE 38: 3GPP TR 38.912 V15.0.0 (2018-06)
NON PATENT LITERATURE 39: 3GPP TR 38.913 V15.0.0 (2018-06)
NON PATENT LITERATURE 40: 3GPP TS 37.213 V15.0.0 (2018-06)

In wireless communication systems, wireless resources and channels for various usages are provided to cope with services anticipated under 5G. However, in some cases these wireless resources and channels are dedicated to particular usages, and might not be able to be efficiently used.

SUMMARY

A base station apparatus that executes a random-access procedure, the base station apparatus includes, a notifier that notifies a terminal apparatus of a transmission permission of a scheduling request by a shared wireless resource, which is part or all of wireless resources used for the random-access procedure; and a receiver that receives a scheduling request transmitted from the terminal apparatus by the shared wireless resource.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 15 is a diagram illustrating an example of wireless resources for transmitting attached information of an SR.

DESCRIPTION OF EMBODIMENTS

The present embodiment will be described below in detail with reference to the figures. Objects and examples in the present specification are exemplary, and do not limit the scope of the present application. Particularly, the technology of the present application is applicable even if expressions in the description are different, as long as technologically equivalent, and different expressions do not limit the scope of the present application.

First Embodiment

A first embodiment will be described.
<Configuration Example of Wireless Communication System>

Figure 1:
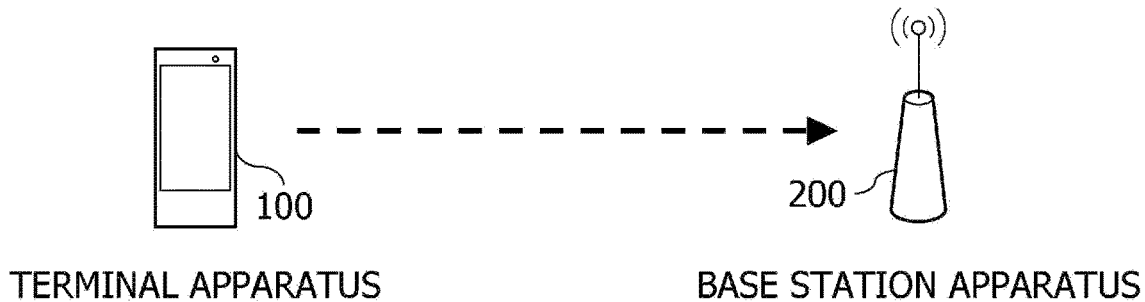
FIG. 1 is a diagram illustrating a configuration example of a communication system 10.

FIG. 1 is a diagram illustrating a configuration example of a communication system 10. The communication system 10 has a terminal apparatus 100 and a base station apparatus 200. The communication system 10 is a wireless communication system that performs wireless communication conforming to 5G, for instance. The base station apparatus 200 in this case is a gNodeB, for instance. The terminal apparatus 100 is an apparatus that communicates with the base station apparatus 200, or with other communication apparatuses via the base station apparatus 200, examples of which include mobile communication terminals, e.g., smartphones, tablet terminals, and so forth.

A channel for the terminal apparatus 100 to perform transmission first, when the terminal apparatus 100 starts communication with the base station apparatus 200, is provided in this communication system 10. This channel is referred to as random-access channel (RACH: Random Access Channel), for instance, and communication start procedures by RACH may be referred to as random-access procedures (Random Access Procedure). The RACH contains information referred to as random-access preamble (or preamble) as information for the base station apparatus 200 to identify wireless signals transmitted by the terminal apparatus 100. This preamble enables the base station apparatus 200 to identify the terminal apparatus 100. A wireless resource that transmits the RACH may be referred to as PRACH (Physical Random Access Channel).

Figure 2:
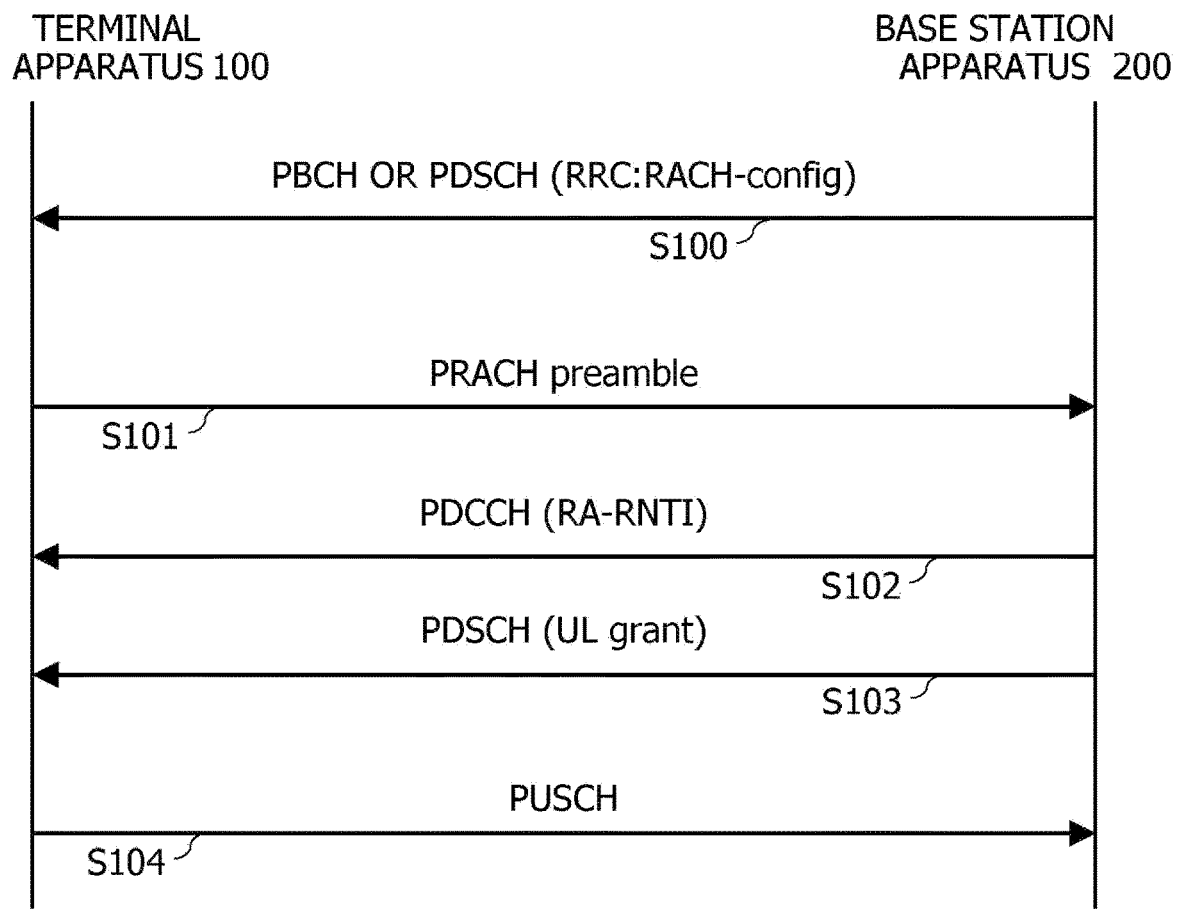
FIG. 2 is a diagram illustrating an example of a sequence of random-access procedures.

FIG. 2 is a diagram illustrating an example of a sequence of random-access procedures. Random-access procedures are carried out at the time of initial access (Initial Access) for the terminal apparatus 100 to establish a connection with the base station apparatus 200, when data signals are generated, and in a case of establishing synchronization at the time of handover, for instance.

The base station apparatus 200 transmits a RACH-config as information relating to RRC settings, using a PBCH (Physical Broadcast Channel) or PDSCH (Physical Downlink Shared Channel) (S100). The RACH-config is information relating to a RACH or PRACH, and includes an identification No. (preamble No.) of a preamble that the corresponding terminal apparatus 100 uses (or has been permitted to use), and so forth, for instance. The terminal apparatus 100 acquires information relating to a RACH or PRACH that the own apparatus can use by receiving the RACH-config.

The terminal apparatus 100 executes the random-access procedures when uplink data is generated, for instance. The terminal apparatus 100 selects one from preambles set by the base station apparatus 200 (regarding which usage is permitted), and transmits a PRACH preamble to the base station apparatus 200 using a PRACH (S101).

The terminal apparatus 100 then stands by to receive a PDCCH (Physical Downlink Control Channel) identified by a RA (Random Access)-RNTI (Radio Network Temporary Identifier) that is an identifier for random access, in a Ra (Random Access)-responseWindow set in the RACH-config, for instance.

Meanwhile, when receiving the PRACH preamble from the terminal apparatus 100 (S101), the base station apparatus 200 transmits a PDCCH containing the RA-RNTI corresponding to the terminal apparatus 100 to the terminal apparatus 100 (S102). A UL grant that is a wireless resource allocation message corresponding to the terminal apparatus 100 is then transmitted by the PDSCH specified in the RA-RNTI (S103).

The terminal apparatus 100 receives the PDCCH containing the RA-RNTI (S102), and receives a PDSCH containing the UL grant specified in the received RA-RNTI (S103).

The terminal apparatus 100 then transmits information relating to the terminal apparatus 100 and UL (UpLink) data to be transmitted to the base station apparatus 200 following the received UL grant, using a PUSCH (Physical Uplink Shared Channel) (S104). This ends the series of random-access procedures.

Also, in the communication system 10, one or both of the base station apparatus 200 and the terminal apparatus 100 transmit using an Unlicensed band that does not require a license in some cases. In a case of using an Unlicensed band, the base station apparatus 200 or the terminal apparatus 100 performs LBT (Listen-before-talk) to confirm whether or not other terminal apparatuses 100 or communication apparatuses are transmitting signals by Unlicensed band. The base station apparatus 200 or the terminal apparatus 100 measures the usage state of a predetermined communication band (e.g., noise ratio, reception power, etc.) by LBT, and uses an Unlicensed band not used by another apparatus.

Further, the terminal apparatus 100 transmits a scheduling request (SR: Scheduling Request) regarding wireless resources to the base station apparatus 200 in a case where data to be transmitted (UL data) is newly generated in the communication system 10. The terminal apparatus 100 receives a UL grant from the base station apparatus 200 as a response to the SR, and transmits data to the base station apparatus 200 using the wireless resource specified in the received UL grant. Note that in Non-Patent Literature 16, in a case of not transmitting other signals at the same time along with the scheduling request, the terminal apparatus 100 uses PUCCH (Physical Uplink Control Channel) format 0 or 1.

In the first embodiment, the terminal apparatus 100 transmits an SR, for instance, to the base station apparatus 200 using a PRACH in some cases. In the first embodiment, the terminal apparatus 100 uses part or all of the PRACHs as wireless resources for transmitting SRs to the base station apparatus 200 with which initial access by random-access procedures is complete and connection has been established, for instance. Conversely, in the first embodiment, the base station apparatus 200 allocates part or all of the PRACHs as wireless resources for a certain terminal apparatus 100 to transmit SRs, and notifies the terminal apparatus 100 thereof, and the terminal apparatus 100 receives the allocated PRACHs as wireless resources for SR transmission. The communication system 10 can thus use part or all of the PRACHs as wireless resources for SR transmission, which enables efficient usage of wireless resources. Hereinafter, PRACHs for RACH transmission, which are also PRACHs permitted to perform SR transmission in common, may be referred to as shared wireless resources.

<Configuration Example of Base Station Apparatus>

Figure 3:
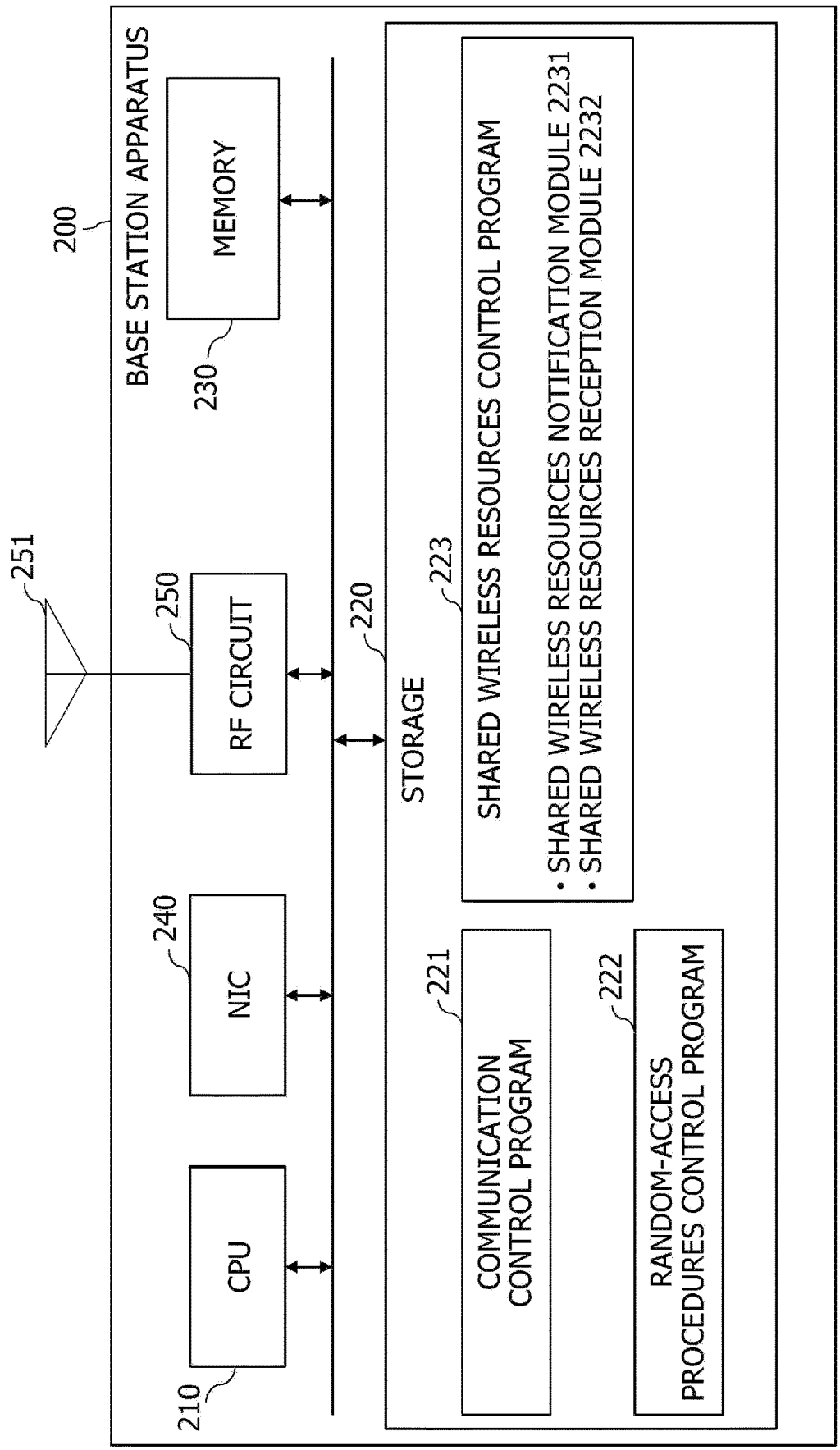
FIG. 3 is a diagram illustrating a configuration example of the base station apparatus 200.

FIG. 3 is a diagram illustrating a configuration example of the base station apparatus 200. The base station apparatus 200 is a gNodeB in 5G, for instance. The base station apparatus 200 has a CPU (Central Processing Unit) 210, storage 220, memory 230, e.g., DRAM (Dynamic Random Access Memory) or the like, an NIC (Network Interface Card) 240, and an RF (Radio Frequency) circuit 250. The base station apparatus 200 wirelessly connects to the terminal apparatus 100 and exchanges data with the terminal apparatus 100, for instance. The base station apparatus 200 also is a relay apparatus for communication carried out by the terminal apparatus 100, by transmitting data received from the terminal apparatus 100 to a communication apparatus or a network that is a transmission destination, transmitting data received from another communication apparatus or network to the terminal apparatus 100, and so forth.

The storage 220 is an auxiliary storage apparatus, e.g., flash memory, an HDD (Hard Disk Drive), an SSD (Solid State Drive), or the like, storing programs and data. The storage 220 stores a communication control program 221, a random-access procedures control program 222, and a shared wireless resources control program 223.

The memory 230 is a region where programs stored in the storage 220 are loaded. The memory 230 is also used as a region where programs store data.

The NIC 240 is a network interface that connects to a network (omitted from illustration), e.g., as the Internet, an intranet, or the like. The base station apparatus 200 communicates with communication apparatuses connected to the network, via the NIC 240.

The RF circuit 250 is an apparatus that wirelessly connects to the terminal apparatus 100. The RF circuit 250 has an antenna 251, for instance.

The CPU 210 is a processor or a computer that realizes each of the processes by loading programs stored in the storage 220 to the memory 230 and running the loaded programs.

The CPU 210 performs communication control processing by running the communication control program 221. Communication control processing is processing for controlling wireless communication with the terminal apparatus 100.

The CPU 210 performs random-access procedures processing by running the random-access procedures control program 222. Random-access procedures processing is processing of executing random-access procedures, an example of which is processing of controlling the sequence of random-access procedures in FIG. 2.

The CPU 210 constructs a response unit, a reception unit, and a transmission unit, and performs shared wireless resources control processing, by running the shared wireless resources control program 223. Shared wireless resources control processing is processing of performing control regarding shared wireless resources. In the shared wireless resources control processing, the base station apparatus 200 decides which wireless resources will be made to serve as shared wireless resources, notifies the terminal apparatus 100 of information relating to shared wireless resources (control information), and so forth. The base station apparatus 200 also receives SRs by shared wireless resources in the shared wireless resources control processing. Note that after receiving an SR, the base station apparatus 200 transmits a response (UL grant) to the terminal apparatus 100 as to the SR.

Also, the CPU 210 constructs a notification unit and performs shared wireless resources notification processing by running a shared wireless resources notification module 2231 that the shared wireless resources control program 223 has. The shared wireless resources notification processing is processing of notifying the terminal apparatus 100 of control information relating to shared wireless resources.

The CPU 210 further constructs a reception unit and performs shared wireless resources reception processing by running a shared wireless resources reception module 2232 that the shared wireless resources control program 223 has. The shared wireless resources reception processing is processing of receiving an SR transmitted by shared wireless resources.

<Configuration Example of Terminal Apparatus>

Figure 4:
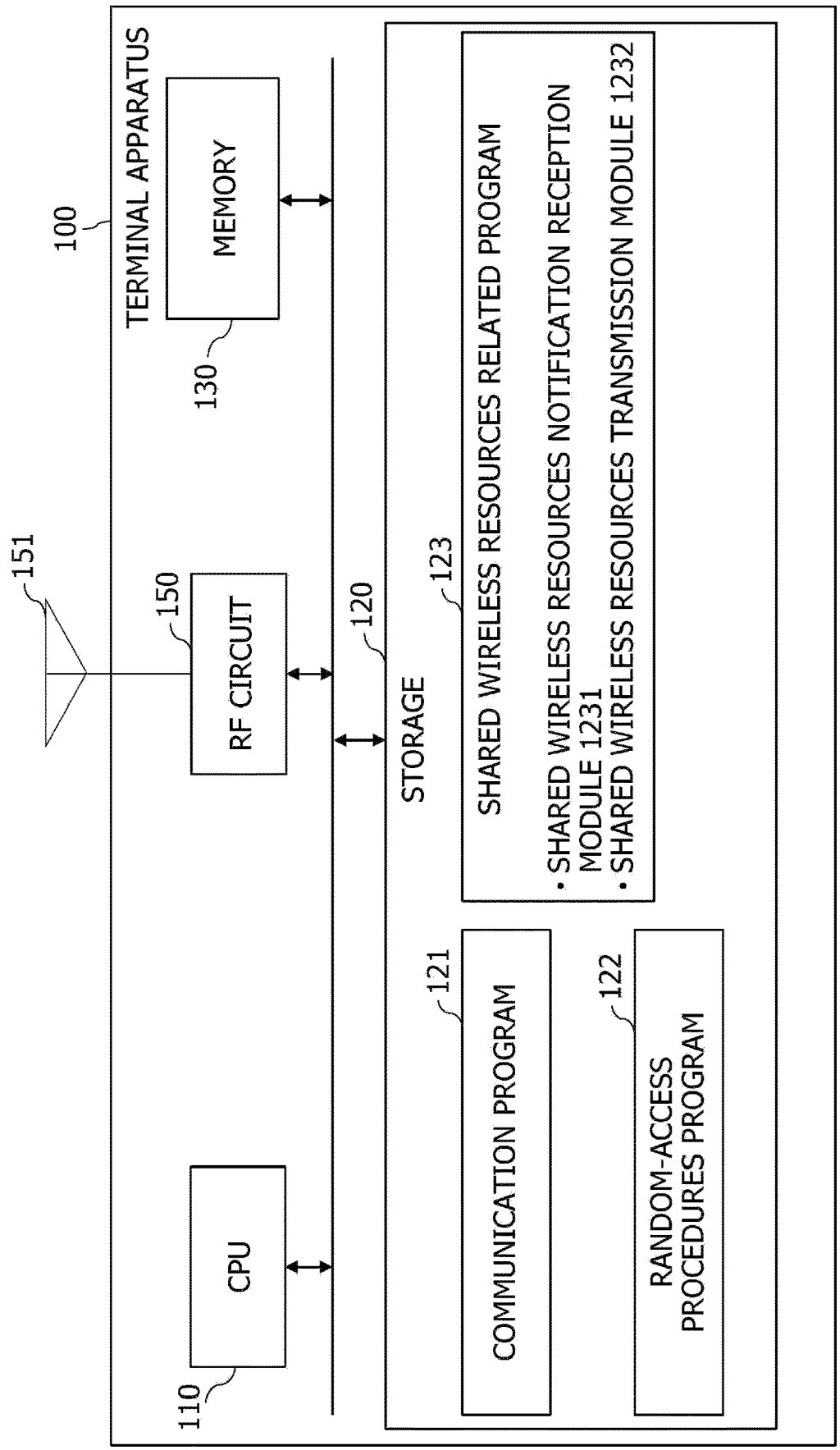
FIG. 4 is a diagram illustrating a configuration example of the terminal apparatus 100.

FIG. 4 is a diagram illustrating a configuration example of the terminal apparatus 100. The terminal apparatus 100 is a mobile terminal apparatus that performs wireless communication with the base station apparatus 200, for instance. The terminal apparatus 100 has a CPU 110, storage 120, memory 130, e.g., DRAM or the like, and an RF circuit 150. The terminal apparatus 100 is a communication apparatus that wirelessly connects to the base station apparatus 200 and exchanges data with the base station apparatus 200, for instance.

The storage 120 is an auxiliary storage apparatus, e.g., flash memory, an HDD, an SSD, or the like, storing programs and data. The storage 120 stores a communication program 121, a random-access procedures program 122, and a shared wireless resources related program 123.

The memory 130 is a region where programs stored in the storage 120 are loaded. The memory 130 is also used as a region where programs store data.

The RF circuit 150 is an apparatus that wirelessly connects to the base station apparatus 200. The RF circuit 150 has an antenna 151, for instance.

The CPU 110 is a processor or a computer that realizes each of the processes by loading programs stored in the storage 120 to the memory 130 and running the loaded programs.

The CPU 110 performs communication processing by running the communication program 121. Communication processing is processing for performing wireless communication with the base station apparatus 200.

The CPU 110 performs random-access procedures processing by running the random-access procedures program 122. Random-access procedures processing is processing of executing random-access procedures, an example of which is processing controlled by the random-access procedures control processing that the base station apparatus 200 performs, for instance.

The CPU 110 constructs a terminal reception unit and a terminal transmission unit, and performs shared wireless resources related processing, by running the shared wireless resources related program 123. Shared wireless resources related processing is processing of using shared wireless resources and receiving notification of permission. In the shared wireless resources related processing, the terminal apparatus 100 acquires information relating to shared wireless resources of which usage has been permitted, transmits SRs using the shared wireless resources, and so forth.

The CPU 110 also constructs a terminal reception unit and performs shared wireless resources notification reception processing by running a shared wireless resources notification reception module 1231 that the shared wireless resources related program 123 has. Shared wireless resources notification reception processing is processing of receiving control information relating to shared wireless resources from the base station apparatus 200.

Further, the CPU 110 constructs a terminal transmission unit and performs shared wireless resources transmission processing, by running a shared wireless resources transmission module 1232 that the shared wireless resources related program 123 has. Shared wireless resources transmission processing is processing of transmitting SRs to the base station apparatus 200 using shared wireless resources.

<Data Transmission Sequence>

Examples of sequences at the time of data transmission are described below. Note that there are three examples of sequences, from pattern 1 to pattern 3, each of which will be described below.

<1. Pattern 1>

Figure 5:
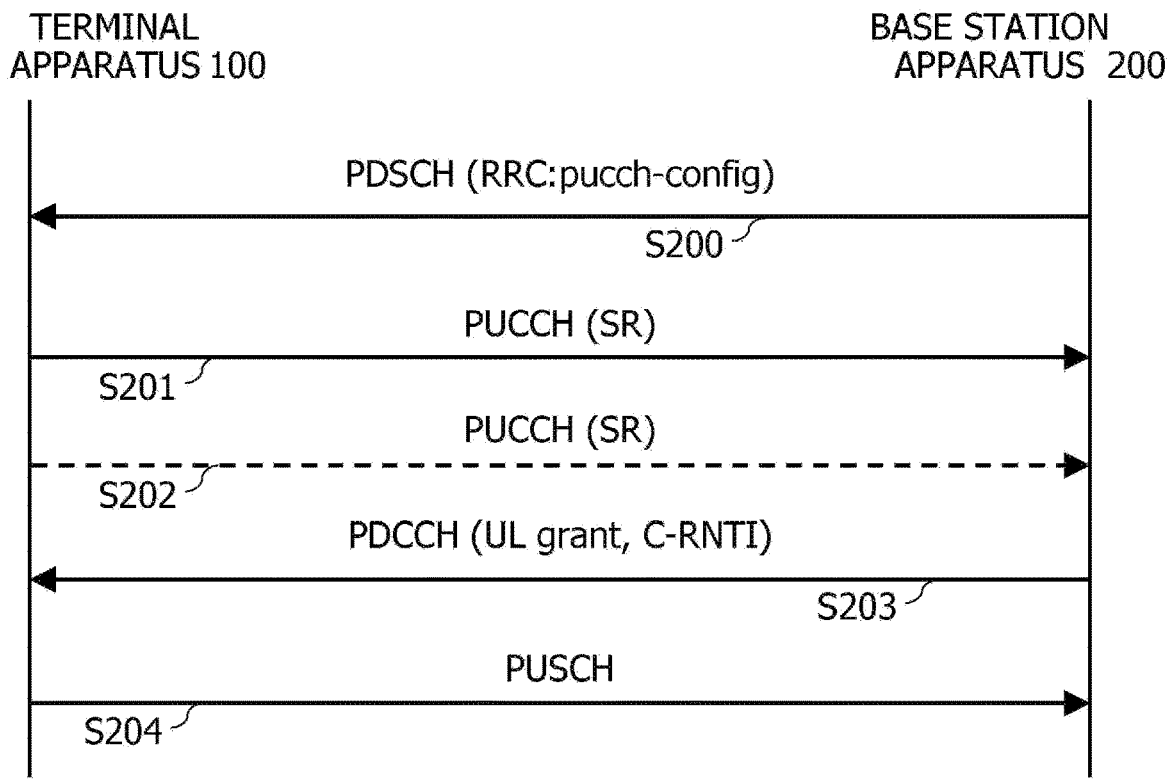
FIG. 5 is a diagram illustrating an example of a sequence of the terminal apparatus 100 transmitting data to the base station apparatus 200 (pattern 1).

FIG. 5 is a diagram illustrating an example of a sequence of the terminal apparatus 100 transmitting data to the base station apparatus 200 (pattern 1). Note that FIG. 5 is a sequence following connection being established between the terminal apparatus 100 and the base station apparatus 200, for instance.

The base station apparatus 200 transmits a PDSCH containing a pucch-config to the terminal apparatus 100 (S200). The pucch-config is settings information relating to PUCCH, and for instance, includes information relating to a PRACH (RACH) that is shared wireless resources regarding which the terminal apparatus 100 has been permitted to transmit PUCCHs including SRs. The pucch-config also contains a notification that the PUCCH format for transmitting SRs (uplink control information format) is of a sequence the same length as the RACH preamble, and that wireless resources of the same size are used, for instance. The terminal apparatus 100 can recognize the shared wireless resources (PRACHs allowing transmission of PUCCHs including SRs) by receiving the pucch-config.

When UL data is generated, for instance, the terminal apparatus 100 transmits a PUCCH including an SR (hereinafter may be expressed as PUCCH (SR)) to the base station apparatus 200 using shared wireless resources following the received pucch-config (S201). Note that when a response corresponding to the SR (UL grant) is not received, the terminal apparatus 100 retransmits the SR (S202). Although retransmission of the SR is one time in FIG. 5, the SR may be retransmitted up to a maximum transmission count that is set, for instance. In a case when no response is received after transmitting the SR for the maximum transmission count, the terminal apparatus 100 releases the PRACH regarding which usage by the PUCCH (SR) is permitted by the pucch-config, for instance.

The base station apparatus 200 that has received the PUCCH (SR) by PRACH resources (shared wireless resources) transmits a UL grant allocating a PUSCH for the terminal apparatus 100 to transmit data, included in a PDCCH (downlink control information), to the terminal apparatus 100 (S203). Note that the PDCCH contains a C-RNTI (Cell-Radio. Network Temporary Identifier) that is an identifier for the terminal apparatus 100 to identify the UL grant.

Upon receiving the UL grant addressed to itself (S203), the terminal apparatus 100 transmits data to the base station apparatus 200 using the PUSCH following the received UL grant (S204).

<2. Pattern 2>

Figure 6:
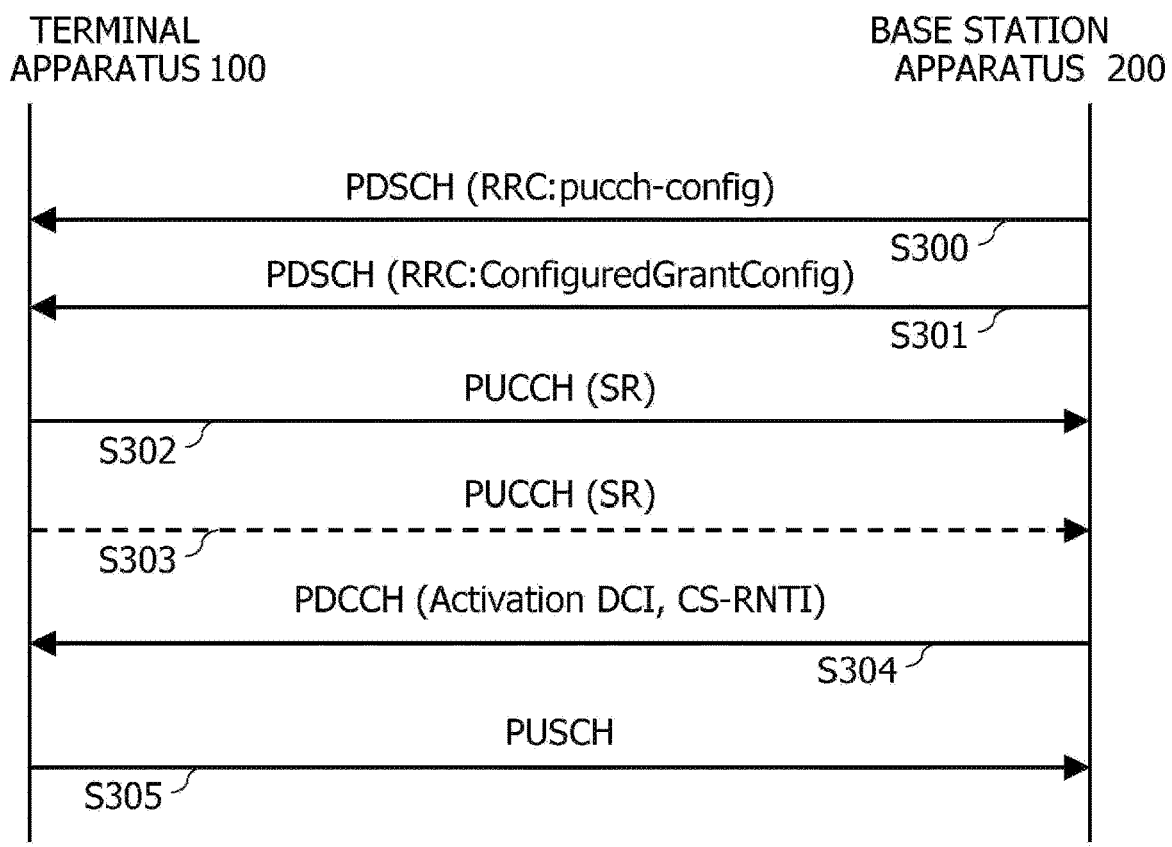
FIG. 6 is a diagram illustrating an example of a sequence of the terminal apparatus 100 transmitting data to the base station apparatus 200 (pattern 2).

FIG. 6 is a diagram illustrating an example of a sequence of the terminal apparatus 100 transmitting data to the base station apparatus 200 (pattern 2). Note that FIG. 6 is a sequence following connection being established between the terminal apparatus 100 and the base station apparatus 200, for instance.

The base station apparatus 200 transmits a PDSCH containing a pucch-config to the terminal apparatus 100 (S300). The pucch-config contains information the same as in pattern 1, for instance. Also, the pucch-config may contain information making notification that a ConfiguredGrant-Config containing information relating to wireless resources set (allocated) in advance will be transmitted by PDSCH, for instance.

The base station apparatus 200 then transmits the PDSCH containing the ConfiguredGrantConfig to the terminal apparatus 100 (S301). By acquiring the ConfiguredGrantConfig, the terminal apparatus 100 acquires information relating to wireless resources regarding which usage has been permitted (or candidates for permission of usage).

Upon UL data being generated, for instance, the terminal apparatus 100 transmits a PUCCH (SR) to the base station apparatus 200, using shared wireless resources following the received pucch-config (S302). Note that the terminal apparatus 100 may retransmit the SR in a case of not receiving a response (UL grant) to the SR (S303).

Upon receiving the PUCCH (SR) by the PRACH resources (common wireless resources), the base station apparatus 200 includes an Activation DCI (Downlink Control Information) containing information relating to wireless resources (PUSCH) that the terminal apparatus 100 is to be permitted to use, in a PDCCH, and transmits to the terminal apparatus 100 (S304). Note that the PDCCH contains a CS-RNTI that is an identifier for the terminal apparatus 100 to identify the Activation DCI.

Upon receiving the Activation DCI addressed to itself (S304), the terminal apparatus 100 transmits data to the base station apparatus 200 using the PUSCH following the received Activation DCI (S305).

Note that in patterns 1 and 2 for data transmission, the communication system 10 can efficiently use wireless resources by using wireless resources used for random-access procedures (PRACH, RACH) for SR transmission.

<3. Pattern 3>

Figure 7:
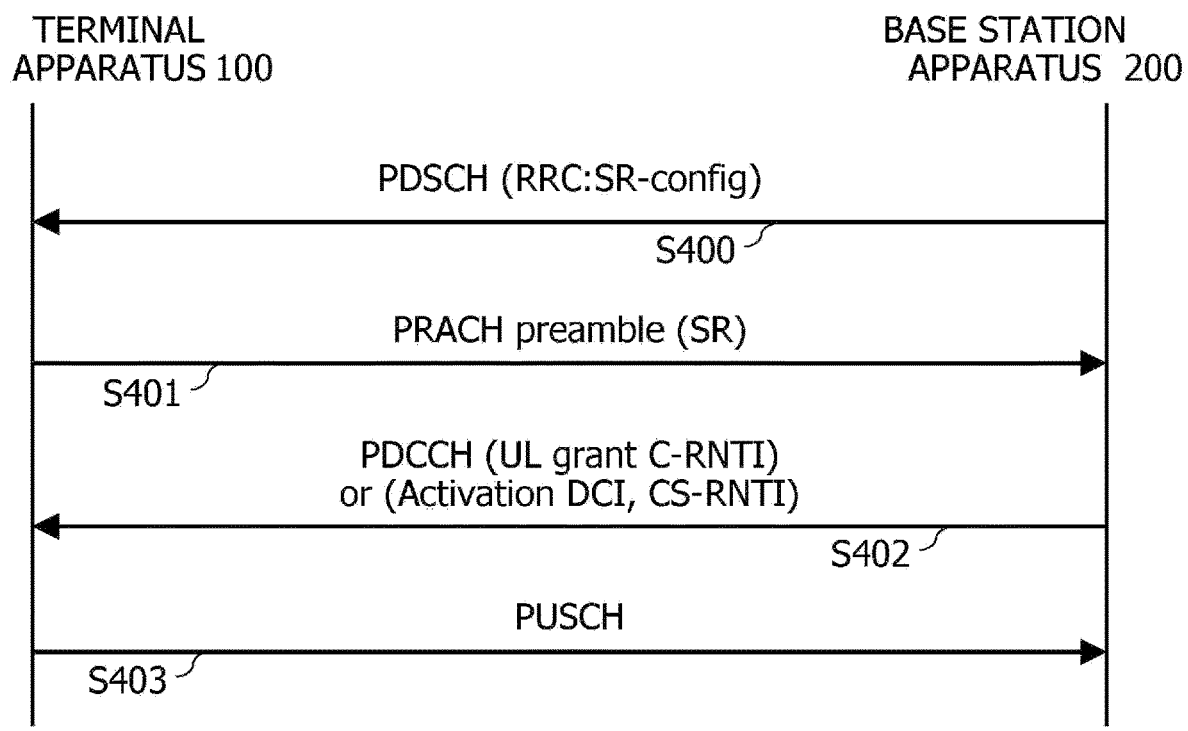
FIG. 7 is a diagram illustrating an example of a sequence of the terminal apparatus 100 transmitting data to the base station apparatus 200 (pattern 3).

FIG. 7 is a diagram illustrating an example of a sequence of the terminal apparatus 100 transmitting data to the base station apparatus 200 (pattern 3). Note that FIG. 7 is a sequence following connection being established between the terminal apparatus 100 and the base station apparatus 200, for instance.

In patterns 1 and 2 of data transmission sequences, the terminal apparatus 100 transmits a PUCCH (SR) using shared wireless resources (PRACH). Conversely, in pattern 3, the terminal apparatus 100 transmits a PRACH preamble containing an SR (hereinafter may be referred to as PRACH preamble (SR)) to the base station apparatus 200. Shared wireless resources for transmission of SRs are defined as contention free RACH preamble in the communication system 10. The base station apparatus 200 individually sets preambles for SRs for the terminal apparatus 100 by RRC settings. That is to say, the RACH procedure is defined since the terminal apparatus 100 transmits SRs using RACH in the communication system 10.

The base station apparatus 200 transmits a PDSCH containing an SR-config to the terminal apparatus 100 (S400). The SR-config contains information relating to shared wireless resources which the terminal apparatus 100 has been permitted to transmit SRs, for instance. The terminal apparatus 100 recognizes the shared wireless resources to use for SR transmission by receiving the SR-config.

Upon UL data being generated, for instance, the terminal apparatus 100 transmits a PRACH preamble (SR) to the base station apparatus 200 by the stipulated RACH format (random-access procedures format), using the shared wireless resources following the received SR-config (S401). Note that the terminal apparatus 100 may retransmit the SR in a case of not receiving a response (UL grant) to the SR (omitted from illustration).

Upon receiving an SR by PRACH resources (shared wireless resources), the base station apparatus 200 includes a UL grant or Activation DCI for the terminal apparatus 100 to transmit data in a PDCCH, and transmits to the terminal apparatus 100 (S402). Note that the PDCCH contains a C-RNTI for the terminal apparatus 100 to identify the UL grant, or a CS-RNTI for the terminal apparatus 100 to identify the Activation DCI.

Upon receiving the UL grant or Activation DCI addressed to itself (S402), the terminal apparatus 100 transmits data to the base station apparatus 200 using the PUSCH following the received UL grant or Activation DCI (S403).

<Shared Wireless Resources>

Next, shared wireless resources will be described. Shared wireless resources are part or all of PRACHs in random-access procedures, and are wireless resources regarding which the terminal apparatus 100 is permitted to transmit SRs. That is to say, the PUCCH wireless resources for SR transmission and the PRACH wireless resources are unified, so as to be wireless resources using time-frequency resources of a sequence of the same length, and the same bandwidth (occupied bandwidth).

Figure 8:
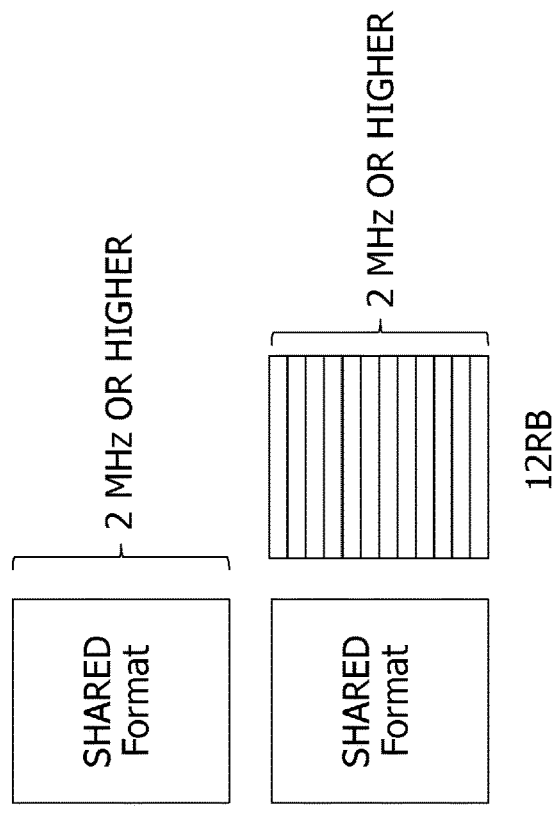
FIG. 8 is a diagram illustrating an example relating to occupied bandwidth of the shared format.

A shared format indicating the configuration of shared wireless resources in the communication system 10 will be defined. FIG. 8 is a diagram illustrating an example relating to occupied bandwidth of the shared format. For instance, a PUCCH transmitting an SR (e.g., Format 0) is defined by one resource block (RB). Also, for instance, a PRACH is defined by six resource blocks or 12 resource blocks. Therefore, a shared format is defined that conforms to a PRACH configured of 12 resource blocks, using the greatest resource blocks in FIG. 8, for instance.

Note that the occupied bandwidth of the shared format that is "2 MHz or higher" is an example of a case assuming LBT in Unlicensed band. For instance, in a case where the occupied bandwidth of Talk (transmission) in LBT is stipulated to be "2 MHz or higher" in the future, PRACH and PUCCH may also need to be "2 MHz or higher" is some cases. This is why the shared format is set to "2 MHz or higher", but this value may change depending on the occupied bandwidth of Talk in LBT, and further there is no particular need to limit the occupied bandwidth in Licensed band.

Figure 9:
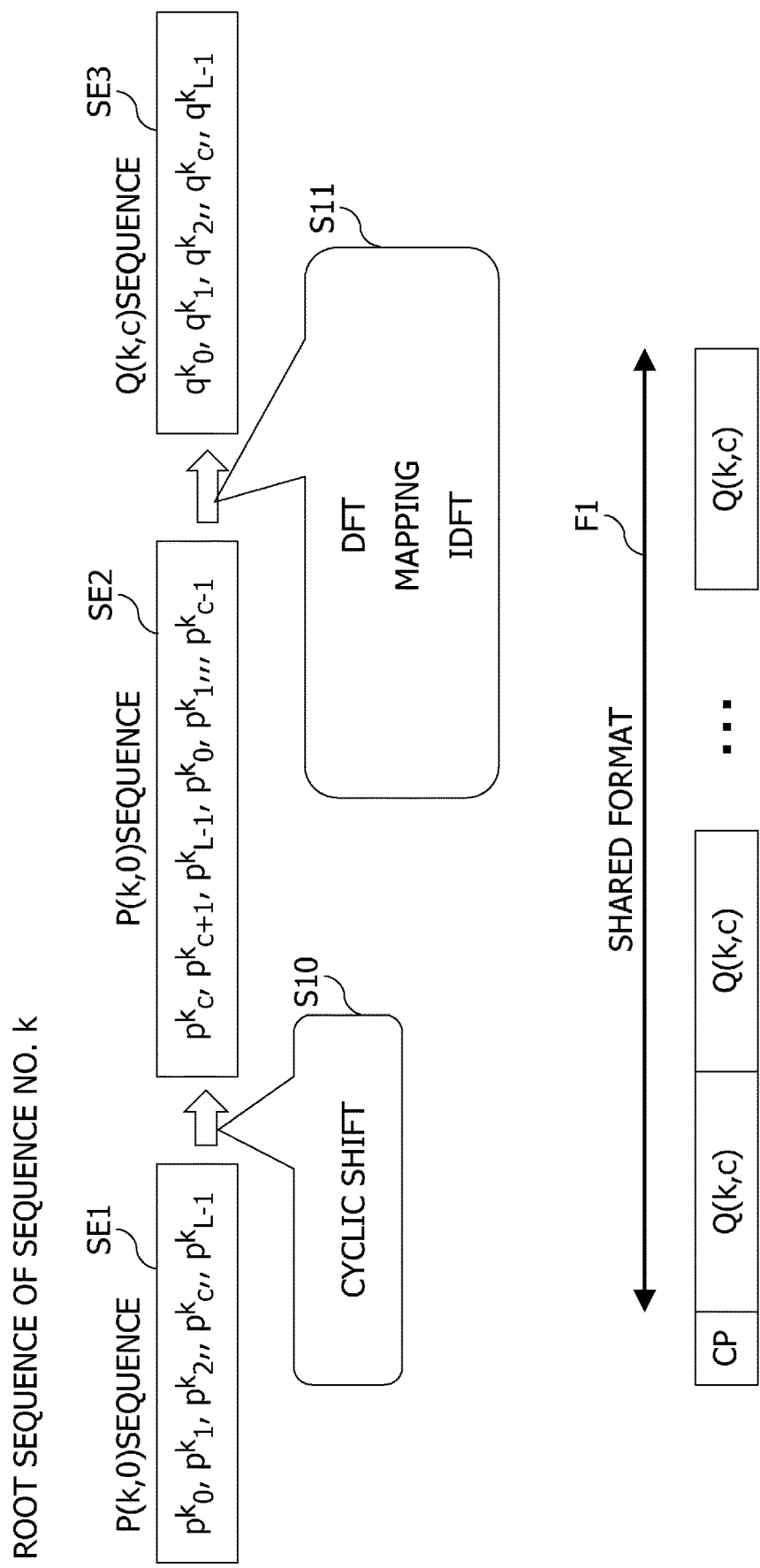
FIG. 9 is a diagram illustrating an example of generating signals based on the shared format.

FIG. 9 is a diagram illustrating an example of generating signals based on the shared format. The RACH Preamble and SR transmission signals to be applied to shared wireless resources are unified with regard to, for instance, the length of root sequence, subcarrier spacing, and size of time-frequency resources mapped. Hereinafter, sequence name X, root sequence name y, and sequence of cyclic shift amount z will be expressed as an X(y, z) sequence.

The terminal apparatus 100 performs cyclic shifting by c on a P(k, 0) sequence (SE1) (S10) and generates a P(k, c) sequence (SE2). The terminal apparatus 100 then subjects the generated P(k, c) sequence to discrete Fourier transform (Discrete Fourier Transform: DFT), maps the results of DFT in the frequency direction, further subjects the results of mapping to inverse discrete Fourier transform (Inverse Discrete Fourier Transform: IDFT), thereby generating a Q(k, c) sequence (SE3) (S11). Note that mapping in the frequency direction is performed continuously or non-continuously. For instance, resource blocks may be configured internally of a plurality of continuous subcarriers, while between resource blocks may be discrete.

Now, the root sequence may be multiplied by an orthogonal sequence instead of cyclic shifting, as a method of generating a plurality of sequences from one root sequence. Also, as a method for generating the Q(k, c) sequence (SE3), the root sequence in the frequency region may be directly stipulated and cyclic shifting be realized by equivalency processing in the frequency region, instead of the processing of stipulating the root sequence in the temporal region and performing cyclic shifting through DFT, thereby omitting the DFT processing.

The terminal apparatus 100 then configures a sequence section with one or a plurality of Q(k, c) sequences, imparts a cyclic prefix (Cyclic Prefix: CP) for instance, and generates shared wireless resources (shared format) (F1).

Note that the temporal length of the shared wireless resources (length of sequence section, repeat count of sequence) may be the same or may be different between when using for RACH and when using for SR.

For instance, the temporal length may be different in a case where the base station apparatus 200 performs transmission and reception by a plurality of beams. In a case of initial access from the terminal apparatus 100 to the base station apparatus 200, the base station apparatus 200 may sequentially attempt reception of the RACH preamble by a plurality of beams. In this case, the sequence repeat count needs to be no less than the number of beams being attempted. Conversely, the terminal apparatus 100 has already established wireless connection with the base station apparatus 200 in a case of performing SR, and accordingly reception can be performed with fewer beams as compared to initial access, and the sequence repeat count is lower.

Also, the basic cyclic shift amount may be the same or may be different between the shared format used for RACH and the shared format used for SR. For instance, the number of P(k, c) sequences generated from the same root sequence k can be increased by making the sequence cyclic shift amount for SR to be lower as compared to for RACH. That is to say, a great number of preambles can be generated by making the cyclic shift amount low. The base station apparatus 200 performs timing adjustment for SR by Timing advance, for instance, and accordingly the base station apparatus 200 can be preform reception even if the cyclic shift amount among sequences is low.

Figure 10:
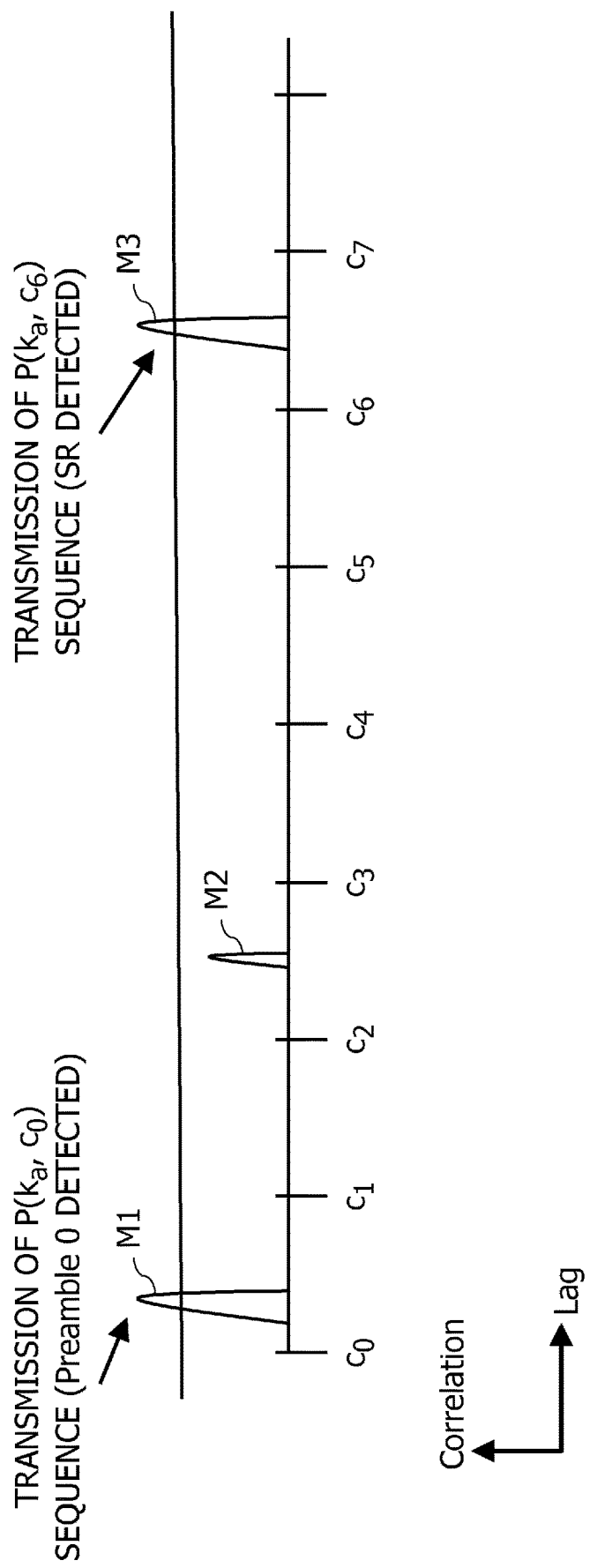
FIG. 10 is a diagram illustrating an example of reception processing at the base station apparatus 200.

FIG. 10 is a diagram illustrating an example of reception processing at the base station apparatus 200. The vertical axis is Correlation (correlation value), and the horizontal axis is Lag (time). The base station apparatus 200 performs correlation processing by the root sequence set regarding to reception signals, for instance, and calculates a correlation value. In a case where the correlation value is a threshold value or higher, the base station apparatus 200 recognizes that a signal has been received from the terminal apparatus 100. In FIG. 10, the base station apparatus 200 detects that reception has been made by a P(ka, c0) sequence by detecting a correlation value M1. The P(ka, c0) sequence is a Preamble 0 (RACH), for instance. The base station apparatus 200 also detects that reception has been made by a P(ka, c6) sequence by detecting a correlation value M3. The P(ka, c6) sequence is an SR, for instance.

Meanwhile, the base station apparatus 200 detects a correlation value M2, but does not recognize having received a signal since the correlation value M2 is less than the threshold value.

Thus, the base station apparatus 200 recognizes reception of signals by comparing correlation values subjected to correlation processing with a threshold value. The correlation processing is executed for each route sequence, and accordingly when there are many root sequences, the processing amount of the base station apparatus 200 also increases.

As described above, the cyclic shift amount can be reduced in the format for SR. The number (types) of Preambles that can be set with a certain sequence length increases when the cyclic shift amount is low. The reason is that the number of Preambles is a numerical value obtained by dividing the sequence length by the cyclic shift amount. Thus, in a case where the number of Preambles to be set is stipulated in the communication system 10, for instance, making the cyclic shift amount lower increases the number of Preambles of one root sequence, and the stipulated number of Preambles can be set with fewer root sequences. That is to say, reducing the cyclic shift amount can suppress the processing amount of the base station apparatus 200.

The shared wireless resources may be used for PRACH (wireless resources for transmitting RACH), or may be used for PUCCH (wireless resources for transmitting PUCCH including SR), or further may be used switching between for PRACH and for PUCCH, for instance.

Figure 11:
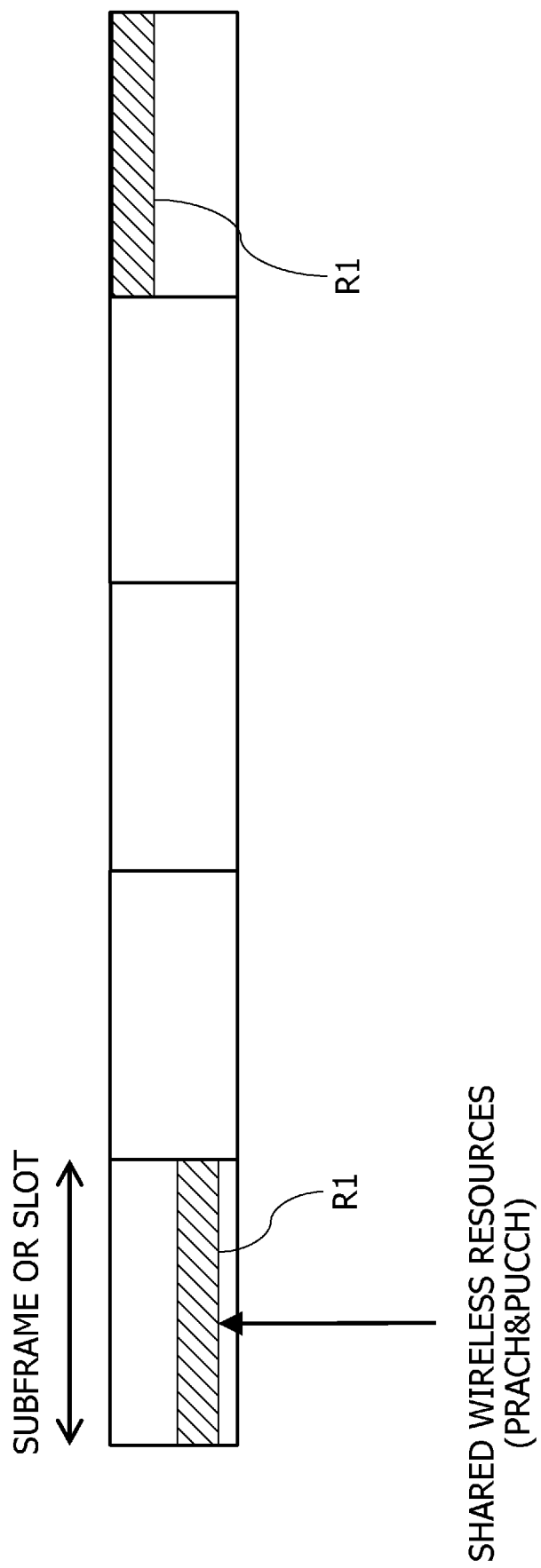
FIG. 11 is a diagram illustrating an example of usage of using shared wireless resources.

FIG. 11 is a diagram illustrating an example of usage of using shared wireless resources. The base station apparatus 200 lays out shared wireless resources (R1) that may be used either for PRACH or for PUCCH, in the same time-frequency resources with the same cyclic shift amount, in a case where the number of terminal apparatuses 100 connecting thereto is lower than a predetermined number, for instance.

Figure 12:
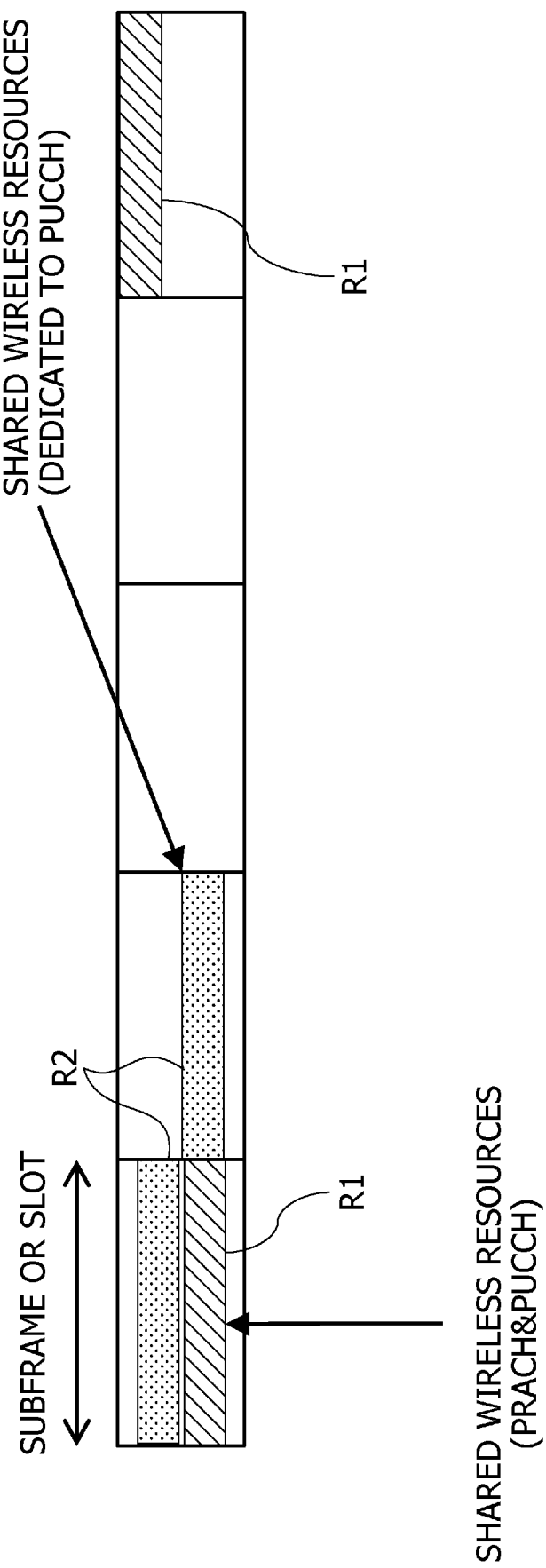
FIG. 12 is a diagram illustrating an example of usage of using shared wireless resources.

FIG. 12 is a diagram illustrating an example of usage of using shared wireless resources. The base station apparatus 200 lays out shared wireless resources (R2) dedicated to PUCCH, in a case where the number of terminal apparatuses 100 connecting thereto is no less than a predetermined number, for instance. Note that although this is dedicated to PUCCH in FIG. 12, this may be dedicated to PRACH instead.

Second Embodiment

Next, a second embodiment will be described. In the second embodiment, the terminal apparatus 100 transmits information attached to an SR to the base station apparatus 200 when transmitting the SR.

<Data Transmission Sequence>

An example of a sequence at the time of data transmission will be described below.

Figure 13:
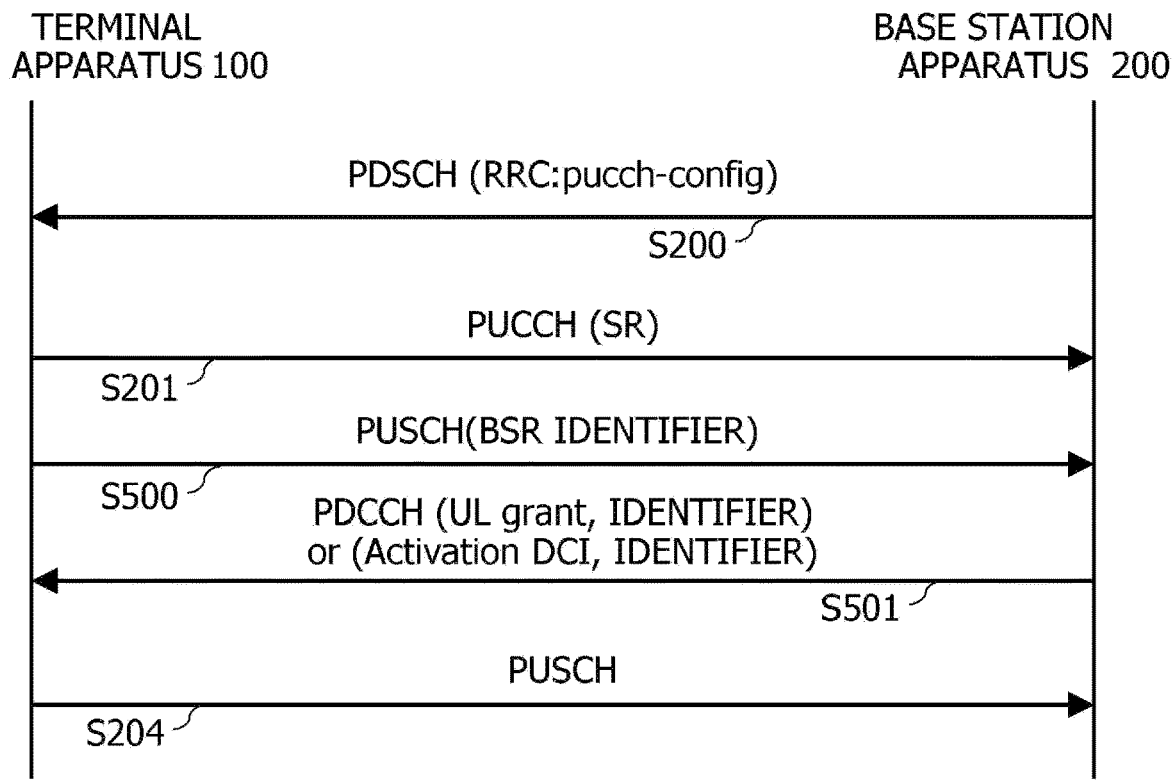
FIG. 13 is a diagram illustrating an example of the sequence of the terminal apparatus 100 transmitting data to the base station apparatus 200.

FIG. 13 is a diagram illustrating an example of the sequence of the terminal apparatus 100 transmitting data to the base station apparatus 200. Note that unless particularly stated otherwise, the processing S200, the processing S201, and the processing S204 in FIG. 13 are the same as the processing S200, the processing S201, and the processing S204 in FIG. 5.

After transmitting the PUCCH (SR) to the base station apparatus 200 (S201), the terminal apparatus 100 transmits a PUSCH containing the attached information of the SR to the base station apparatus 200, prior to receiving the UL grant (S500). The attached information of the SR includes a BSR (Buffer Status Report) indicating the type and the data amount of object data of the SR stored in the buffer (data to be transmitted following reception of a response to the SR), for instance. Also, in a case where the base station apparatus 200 allocates the same time-frequency resources to a plurality of terminal apparatuses 100 for PUSCHs to transmit attached information of SRs, the attached information of the SRs may include identifiers, e.g., C-RNTI for instance. In a case where the base station apparatus 200 uniquely allocates resources for PUCCH (SR) and PUSCH (attached information) to the terminal apparatuses 100, identifiers do not have to be included as attached information of the SRs.

Upon acquiring attached information of the SR (S500), the base station apparatus 200 allocates wireless resources on the basis of the received attached information of the SR. In a case in which the allowable delay time is short for the data, for instance, the base station apparatus 200 allocates wireless resources to the terminal apparatus 100 by which transmission can be made to the base station apparatus 200 at a maximally early timing. Also, ConfiguredGrantConfig sets resources usable for periodic transmission in advance, and in a case in which the attached information of the SR indicates data periodically generated, the resources set in advance are allocated to the terminal apparatus 100.

The base station apparatus 200 then transmits a UL grant or an Activation DCI containing information relating to the allocated wireless resources to the terminal apparatus 100 by PDCCH (S501).

Figure 14:
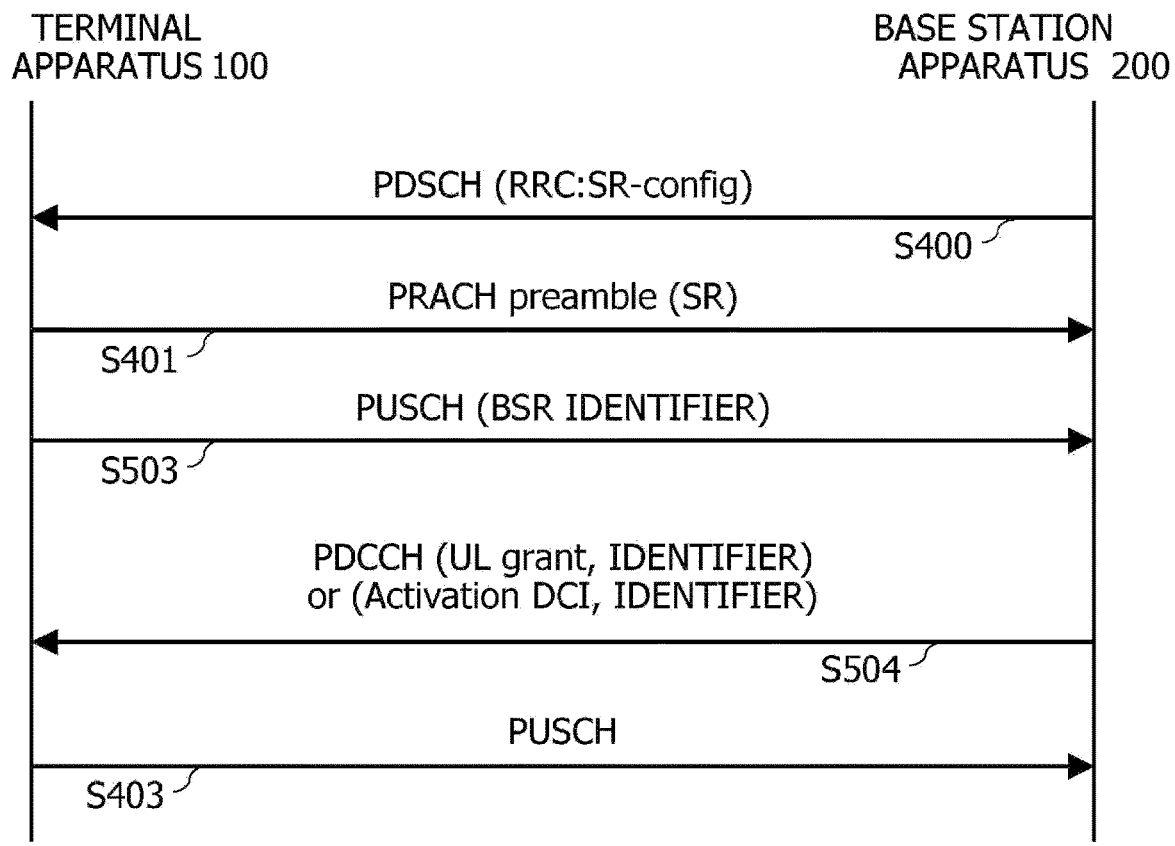
FIG. 14 is a diagram illustrating an example of the sequence of the terminal apparatus 100 transmitting data to the base station apparatus 200.

FIG. 14 is a diagram illustrating an example of the sequence of the terminal apparatus 100 transmitting data to the base station apparatus 200. Note that unless particularly stated otherwise, the processing S400, the processing S401, and the processing S403 in FIG. 14 are the same as the processing S400, the processing S401, and the processing S403 in FIG. 7.

After transmitting the PRACH preamble (SR) to the base station apparatus 200 (S401), the terminal apparatus 100 successively transmits a PUSCH containing the attached information of the SR to the base station apparatus 200, prior to receiving the UL grant or Activation DCI (S503). Also, in a case where the base station apparatus 200 allocates the same time-frequency resources to a plurality of terminal apparatuses 100 for PUSCHs to transmit attached information of SRs, the attached information of the SRs may include identifiers, e.g., C-RNTI for instance. In a case where the base station apparatus 200 uniquely allocates resources for PRACH preamble (SR) and PUSCH (attached information) to the terminal apparatuses 100, identifiers do not have to be included as attached information of the SRs.

Upon acquiring attached information of the SR (S503), the base station apparatus 200 allocates wireless resources on the basis of the received attached information of the SR.

The base station apparatus 200 then transmits a UL grant or an Activation DCI containing information relating to the allocated wireless resources to the terminal apparatus 100 by PDCCH (S504).

In the second embodiment, the base station apparatus 200 is able to perform more appropriate allocation of wireless resources by receiving the attached information of the SR from the terminal apparatus 100.

FIG. 15 is a diagram illustrating an example of wireless resources for transmitting attached information of an SR. The terminal apparatus 100 may use a part (R3) of shared wireless resources as wireless resources for PUSCH for transmitting attached information of the SR. The part (R3) of the shared wireless resources is shared wireless resources not shared with PRACH, for instance.

Note that while the terminal apparatus 100 transmits a PUSCH including attached information of an SR (e.g., a BSR) using the shared wireless resources R3 in FIG. 15, shared wireless resources do not have to be used. Also, the correlative relation between wireless resources for SRs and wireless resources for attached information of SRs may be one to one, or may be many to one. If the frequency of the terminal apparatuses 100 transmitting SRs is low, wireless resources can be efficiently used by setting to many to one. Transmission of SRs and attached information is executed temporally consecutively (using wireless resources immediately following SR transmission), for instance. Accordingly, when transmission is performed using Unlicensed band, the terminal apparatus 100 can transmit both with a single LBT, and delay can be reduced.

Other Embodiments

The first embodiment and the second embodiment may be combined. For instance, in the sequence in FIG. 6 in the first embodiment, the terminal apparatus 100 may transmit attached information of an SR in the second embodiment.

Also, an arrangement may be made in which a plurality of SRs is stipulated in accordance with data types, and PUCCH (SR) or PRACH preamble (SR) are applied regarding each SR, hence the terminal apparatus 100 transmits SRs including attached information as well.

According to one aspect, wireless resources can be effectively used.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present Invention have been described in detail, it should be understood that the various changes, substitutions, and alterations could be made hereto without departing from the spirit and scope of the invention.

What is claimed is:

1. A base station apparatus that executes a random-access procedure, the base station apparatus comprising:
a notifier that notifies a terminal apparatus of a transmission permission of a scheduling request by a wireless resource, the wireless resource being part or all of wireless resources configured for the random-access procedure; and
a receiver that receives a scheduling request transmitted from the terminal apparatus by the wireless resource,
wherein a format of the wireless resource is communalized with a format in transmitting of the scheduling request without using the wireless resource, with respect to a length of a root sequence, a subcarrier interval, and an occupied bandwidth.

2. The base station apparatus according to claim 1, wherein the scheduling request is transmitted using an uplink control information format with which uplink control information relating to communication from the terminal apparatus toward the base station apparatus is transmitted.

3. The base station apparatus according to claim 2, wherein the uplink control information format includes PUCCH (Physical Uplink Control Channel).

4. The base station apparatus according to claim 1, wherein the scheduling request is transmitted using a random-access procedure format transmitted from the terminal apparatus to the base station apparatus in the random-access procedure.

5. The base station apparatus according to claim 4, wherein the random-access procedure format includes a RACH (Random Access Channel) format used in the random-access procedure.

6. The base station apparatus according to claim 1, further comprising a response controller that, after receiving the scheduling request, transmits a response to the scheduling request using downlink control information relating to communication from the base station apparatus toward the terminal apparatus.

7. The base station apparatus according to claim 6, wherein the downlink control information includes PDCCH (Physical Downlink Control Channel).

8. The base station apparatus according to claim 1, wherein a cyclic shift amount applied to a scheduling request transmitted by the wireless resource is less than a cyclic shift amount applied to the wireless resource used in the random-access procedure.

9. The base station apparatus according to claim 1, wherein a cyclic shift amount applied to a scheduling request transmitted by the wireless resource is less than a cyclic shift amount applied to the wireless resource used in the random-access procedure.

10. The base station apparatus according to claim 1, wherein the terminal apparatus confirms a usage state of a predetermined communication band prior to transmission of the scheduling request or transmission of a signal in the random-access procedure.

11. The base station apparatus according to claim 1, wherein after receiving the scheduling request, the receiver receives attached information relating to the scheduling request.

12. The base station apparatus according to claim 11, wherein the attached information includes at least one of type and data amount of object data of the scheduling request.

13. The base station apparatus according to claim 11, wherein the attached information is transmitted using a wireless resource immediately after the wireless resource.

14. A terminal apparatus that executes a random-access procedure that executes a random-access procedure, the terminal apparatus comprising:

a terminal receiver that receives from a base station apparatus a notification that transmission of a scheduling request is permitted, using a wireless resource, the wireless resource being part or all of wireless resources configured for the random-access procedure; and a terminal transmitter that transmits the scheduling request by the wireless resource when transmitting data to the base station apparatus, wherein a format of the wireless resource is communalized with a format in transmitting of the scheduling request without using the wireless resource, with respect to a length of a root sequence, a subcarrier spacing, and an occupied bandwidth.

15. A communication system that has a terminal apparatus and a base station apparatus, and executes a random-access procedure between the terminal apparatus and the base station apparatus, wherein the base station apparatus notifies the terminal apparatus of a transmission permission of a scheduling request by a wireless resource, the wireless resource being part or all of wireless resources configured for the random-access procedure, the terminal apparatus receives the notification, and transmits the scheduling request by the wireless resource when transmitting data to the base station apparatus, and the base station apparatus receives the scheduling request transmitted by the wireless resource, wherein a format of the wireless resource is communalized with a format in transmitting of the scheduling request without using the wireless resource, with respect to a length of a root sequence, a subcarrier spacing, and an occupied bandwidth.

* * * * *